United States Patent [19]

Kalkanoglu

[11] Patent Number: 5,437,923
[45] Date of Patent: Aug. 1, 1995

[54] HALOGEN-FREE FLAME-RETARDENT BITUMEN ROOFING COMPOSITION

[75] Inventor: Husnu M. Kalkanoglu, Swarthmore, Pa.

[73] Assignee: GS Roofing Products Company, Inc., Irving, Tex.

[21] Appl. No.: 74,302

[22] Filed: Jun. 9, 1993

[51] Int. Cl.$^6$ .............................................. B32B 11/02
[52] U.S. Cl. ...................................... 428/291; 428/489
[58] Field of Search ................................. 428/291, 489

[56] References Cited

U.S. PATENT DOCUMENTS

| | | | |
|---|---|---|---|
| 2,054,317 | 9/1936 | Gundlach | 91/72 |
| 2,667,425 | 1/1954 | Bierly | 106/15 |
| 3,931,440 | 1/1976 | Shepherd et al. | 428/281 |
| 4,032,393 | 6/1977 | Alfeis et al. | 162/159 |
| 4,055,453 | 10/1977 | Tajima et al. | 156/279 |
| 4,079,158 | 3/1978 | Kennepohl et al. | 428/143 |
| 4,082,885 | 4/1978 | Rashid et al. | 428/281 |
| 4,248,926 | 2/1981 | Tajima et al. | 428/253 |
| 4,278,470 | 7/1981 | Marzocchi et al. | 106/281 R |
| 4,357,377 | 11/1982 | Yamamoto | 428/40 |
| 4,386,981 | 6/1983 | Clapperton | 156/71 |
| 4,405,680 | 9/1983 | Hansen | 428/285 |
| 4,636,414 | 1/1987 | Tajima et al. | 428/40 |
| 4,659,381 | 4/1987 | Walters | 106/18.16 |
| 4,749,731 | 6/1988 | Kyminas et al. | 524/31 |
| 4,757,652 | 7/1988 | Kalkanoglu | 52/173 R |
| 4,804,696 | 2/1989 | Jolitz et al. | 524/68 |
| 4,818,367 | 4/1989 | Winkler | 208/23 |
| 4,859,366 | 8/1989 | Djiauw et al. | 252/602 |
| 4,859,723 | 8/1989 | Kyminas et al. | 524/31 |
| 4,871,477 | 10/1989 | Dimanshteyn | 252/609 |
| 4,904,399 | 2/1990 | Waynick | 252/11 |
| 4,925,494 | 5/1990 | Hageman | 106/280 |
| 5,025,058 | 6/1991 | Senoo | 524/436 |
| 5,055,135 | 10/1991 | Grube et al. | 106/281.1 |
| 5,057,367 | 10/1991 | Morii et al. | 428/389 |
| 5,100,715 | 3/1992 | Zimmerman et al. | 428/147 |
| 5,206,068 | 4/1993 | Kalkanoglu | 428/143 |

FOREIGN PATENT DOCUMENTS 8700852 2/1987 WIPO.
9102776 3/1991 WIPO.

OTHER PUBLICATIONS

"3M Colorquartz Aggregate for pool finishes".
"Flame retardants: In Spite of Enviromental Issues, Demand for Halogens is Strong," *Modern Plastics* (Sep. 1990) 111–115.
Wood, A. Stuart, "Will toxicity concerns doom workhorse flame retardent systems?" *Modern Plastics* (May 1990) 40–44.
"3M Product Data Sheet Colorquartz Aggregate".
"Solem Alumina Thihydrate" Solem Division/ J. M. Huber Corporation.
"Alumina Trihydrate" Solem Division/ J. M. Huber Corporation.
Shen, Kelvin K. "Zinc Borate: The Unique Multifunctional Additive," *Plastics Compounding* (Sep./Oct. 1985).
Shen, Kelvin K. "Zinc borate as a flame retardent in halogen-free wire and cable systems," *Plastics Compounding* (Nov./Dec. 1988.

*Primary Examiner*—Paul J. Thibodeau
*Assistant Examiner*—David Abraham
*Attorney, Agent, or Firm*—Levy, Zito & Grandinetti

[57] ABSTRACT

A halogen-free flame-retardant bitumen composition with improved performance characteristics is described. The flame-retardant bitumen composition contains at least 45 weight percent bitumen, about 2 to 25 weight percent thermoplastic polymer, and about 15 to 35 weight percent of a mixture of flame-retardant compounds. The mixture of flame-retardant compounds comprises alumina trihydrate and/or magnesium hydroxide, at least 2 weight percent zinc borate, and, optionally, about 2 to 20 weight percent calcium carbonate of the final flame-retardant bitumen composition.

6 Claims, No Drawings

HALOGEN-FREE FLAME-RETARDENT BITUMEN ROOFING COMPOSITION

BACKGROUND OF THE INVENTION

1. Field of the Invention

The present invention relates to halogen-free flame-retardant bitumen compositions for use in commercial and residential roof coverings such as roofing membranes and waterproofing underlayments. In particular, the present invention is directed to flame-retardant bitumen compositions with improved performance characteristics that achieve high fire retardancy with low loadings of non-halogenated compounds.

2. Description of the Related Art

Bitumen compositions have been used for decades on residential and commercial roofs as waterproof coverings. Bitumen has been used in shingles, roofing felts, roofing membranes, and similar products as a binder and waterproofing material. Bitumen is a combustible petroleum derivative and lacks any fire retardancy or self-extinguishing properties. Ignited roof coverings, containing untreated bitumen, propagate flames and spread the flames to other areas of the roof. Wind and high roof slopes often add to the intensity of roof fires fueled by untreated bitumen roof coverings.

Building code regulations in many jurisdictions require fire retardant roofing systems that comply with Class A or Class B fire resistance standards, such as those standards established by UL 790 or ASTM E-108, to eliminate or reduce the spread of flames in roof fires. Conventional systems for achieving fire retardancy in commercial roof coverings include surface treatment of the roofing material. Surface treatments include spreading stone chips or gravel over the roofing materials, or painting the surface of the roofing material with coatings that contain fire retardant compounds and/or asbestos. Although these surface treatment methods help provide the roof covering with a Class A or Class B fire rating, these treatment methods are time consuming and labor intensive and, therefore, increase the time required for roofing installation and the expense of the roofing material. A major disadvantage of these surface treatment methods is the weight of the final roofing system. The weight is often increased by gravel and stone chips that are usually applied at a concentration of 400 to 1000 pounds per 100 square feet of roof area (lb per 100 ft$^2$). This concentration of gravel and stone chips is too heavy for many roof structures or "decks" such as roof decks made from plywood or gypsum. When gravel and stone chips are not applied to the roof covering by a flood coat of asphalt, the roofing system does not comply with most wind uplift resistance criteria such as that set forth by Factory Mutual's 4470/4450 Standard. Flame-retardant roof coatings that are painted onto the surface of the roofing material usually crack, peel, or wash away within three to five years from their application and have to be reapplied to maintain the fire rating of a roofing system.

Attempts have been made to incorporate flame-retardant additives directly into roofing materials in order to eliminate the need for gravel, stone chips, or flame-retardant coatings. Although a wide variety of flame-retardant additives are available, commercial demands require that flame-retardant additives be relatively inexpensive due to the competitive pricing structure of the roofing industry. Flame-retardant additives must also be water insoluble, thermally stable, and chemically stable in bitumen compositions. These characteristics are usually provided in bitumen roofing systems by using halogenated compounds or antimony oxide. Flame-retardant additives containing halogenated compounds, such as decabromodiphenyloxide, reduce combustibility of a bitumen roofing system by interfering with the gaseous phase of the burning reaction by releasing another halogen compound, such as bromine.

Compositions containing halogenated compounds or antimony oxide are suspected as possible contributors to the combustion toxicity of many plastic materials. Halogenated compounds and antimony oxide have been banned from use as fire retardant materials in many nations. Halogenated compounds and antimony oxide may present health hazards to the workers, who are involved with the manufacture of products made with these compounds. Additionally, halogenated compounds and antimony oxide release toxic air pollution when burned. In view of these hazards, many manufactures of roofing materials desire to eliminate halogenated compounds and antimony oxide from use in their products.

It has been recognized that antimony oxide can be replaced by several alternative compounds. An article by Stuart Wood, "Will Toxicity Concerns Doom Workhorse Flame-Retardant Systems?," *Modern Plastics* vol. 67 no.5 (May 1990) 40–44, discloses alumina trihydrate and/or zinc borate as an alternative flame-retardant compound for use in synthetic resin compositions such as plastics. Although alumina trihydrate does not require the use of halogen compounds in order to provide an effective flame-retardant compound, alumina trihydrate has a relatively low decomposition temperature and requires high concentrations or "loadings" so as to provide an effective fire resistance rating for a roofing material containing bitumen. Such high loadings of alumina trihydrate have an adverse affect on processing and physical properties of the resultant roofing material and significantly increase the expense of the finished product.

U.S. Pat. No. 5,055,135 to Grube et al. discloses a flame-retardant bituminous composition suitable for use as a roofing material. The composition contains 35 to 60 weight percent asphalt, 2 to 30 weight percent modifier, such as a styrene copolymer, and 35 to 50 weight percent of colemanite. Colemanite is an inorganic composition with fire retardant properties. Colemanite is a natural blend of hydrated oxides such as calcium borate. Other oxides, such as calcium oxide, silicon oxide, aluminum oxide, and magnesium oxide, can be included.

International Patent No. WO 91/02776 to Grube discloses a flame-retardant bitumen composition comprising 35 to 85 percent asphalt, 25 to 40 percent polymeric modifier, and colemanite. Colemanite is used as an inorganic fire retardant mixture in this composition. The bituminous mixture can be impregnated with a glass/polyester composite or fiberglass mats.

Many other presently available flame-retardant bitumen compositions contain large amounts or at least a 35 percent concentration of flame-retardant compounds. Other flame-retardant bitumen compositions include flame-retardant compounds that are partially water soluble. These partially water soluble flame-retardant compounds lose their effectiveness with continued exposure to weather. Other flame-retardant compositions utilize halogen compounds. The performance characteristics of roofing materials decrease, particularly upon aging, when the roofing materials contain a large concentration of inert fillers. Water soluble flame-retardant compounds in roofing material have particularly poor performance characteristics because these compounds are leached from the roofing material upon exposure to water. Partially or fully water soluble flame-retardant compounds, such as ammonium phosphates, can be encapsulated by water-resistant compounds including siloxanes, epoxies, melamine-formaldehydes, or similar polymers to prevent the flame-retardant compound from being leached from the roofing material. This encapsulation process, however, increases the production cost of the roofing material and can result in additional processing difficulties.

SUMMARY OF THE INVENTION

The halogen-free flame-retardant bitumen composition in one embodiment of the present invention comprises at least about 45 weight percent bitumen and an effective concentration of a mixture of flame-retardant compounds. The effective concentration of the mixture of flame-retardant compounds is in the most preferred embodiments about 10 to about 40 weight percent of the composition. The mixture of flame-retardant compounds in these embodiments comprises (1) about 5 to about 30 weight percent of a member selected from the group consisting of alumina trihydrate, magnesium hydroxide, and mixtures of these, (2) about 2 to about 20 weight percent of zinc borate, and, desirably, (3) about 2 to about 20 weight percent of calcium carbonate. The invention, desirably, includes about 2 to about 25 weight percent of thermoplastic polymer. The percentage values, used to describe this invention, are based on the total weight of the final flame-retardant bitumen composition.

The flame-retardant bitumen composition of the invention does not include toxic gas-producing compounds, such as halogenated compounds or antimony oxide, and has small concentrations or "low loadings" of flame-retardant compounds. The significantly lower loadings of the flame-retardant compounds into the bitumen of the present invention permit desirable processing characteristics for the flame-retardant bitumen composition when it is used to form roofing or other materials. The mixture of flame-retardant compounds of the invention does not produce toxic gases during combustion of the flame-retardant bitumen composition. The flame-retardant bitumen composition has desirable physical properties including flexibility, aging characteristics, and tensile properties.

DETAILED DESCRIPTION OF THE INVENTION

The halogen-free flame-retardant bitumen composition of the present invention comprises from about 45 to about 98 weight percent bitumen and an effective amount of a mixture of halogen-free flame-retardant compounds based on the total weight of the flame-retardant bitumen composition. The mixture of flame-retardant compounds comprises about 5 to about 30 weight percent of alumina trihydrate, magnesium hydroxide, or mixtures thereof, about 2 to about 20 weight percent of zinc borate, and, optionally, up to about 20 weight percent of calcium carbonate based on the total weight of the final flame-retardant bitumen composition.

The present invention is a halogen-free flame-retardant bitumen composition for use in commercial and residential roofing material such as roofing membranes and waterproofing underlayments. The bitumen compound or base, that is used to make the halogen-free flame-retardant bitumen composition of the invention, can be a polymer modified bitumen or an unmodified bitumen. The bitumen compound is combined with a mixture of halogen-free flame-retardant compounds in "low-loading" amounts. The resulting halogen-free flame-retardant bitumen composition has unexpectedly good processing characteristics and provides fire resistance to the final product.

The bitumen used in the present invention is, preferably, selected from "penetration" (pen) or viscosity grade bitumen. In alternative embodiments of the invention, the bitumen can be a roofing flux or an oxidized bitumen. Oxidized bitumen is usually designated as a shingle saturant or shingle coating. Preferably, the bitumen has a softening point of about 75° F. to about 240° F. (about 23.9° C. to 115.6° C.) and a penetration at 77° F. (25° C.) of 5 to 350 decimillimeters (dmm). The term "decimillimeters" is a term used within this art to represent ten millimeters of penetration.

The bituminous coating, which is used in roofing membranes, can consist of oxidized, blown bitumen and mineral dust stabilizers such as limestone, talc, mica, and the like. In a preferred embodiment of the invention, the physical and mechanical properties of the bitumen are modified with thermoplastic polymer additives before the bituminous coating is applied.

The flame-retardant bitumen composition generally contains about 45 to 98 weight percent bitumen. In desirable embodiments of the invention, the flame-retardant bitumen composition contains 45 to 80 weight percent and, preferably, 55 to 65 weight percent bitumen based on the total weight of the final flame-retardant bitumen composition. The amount of bitumen contained in the composition depends on the grade of bitumen used and the type and amount of thermoplastic polymer added to the flame-retardant bitumen composition.

The flame-retardant bitumen composition of the present invention is, preferably, "modified" with a thermoplastic polymer to provide improved flexibility and aging characteristics. Suitable modifiers are polymers that are compatible with bitumen. Exemplary thermoplastic modifiers, that are compatible with bitumen, include styrene-butadiene-styrene block copolymer (SBS), styrene-ethylene-butylene-styrene block copolymer (SEBS), styrene-isoprene-styrene block copolymer (SIS), styrene-butadiene diblock polymer (SB), ethylene-propylene polymer (EP), amorphous or "atactic" polypropylene (APP), and the like. These polymers can be used either by themselves or in combination with each other to modify bitumen for use in this invention. These polymers, due to their thermoplastic characteristics, are readily mixed with bitumen in high shear in-line or in-tank mixers or in low shear in-tank agitators at temperatures of about 320° F. to about 390° F. (about 160° C. to about 198.8° C.). The polymers are fully liquified and dispersed in the bitumen under these mixing conditions.

The polymer-modified bitumen blend in one embodiment of the invention comprises a mixture of about 75 to about 98 weight percent of bitumen, having a softening point between about 75° F. to about 240° F. (about 23.9° C. to about 115.6° C.) and a penetration at 77° F. (25°

C.) between 5 and 350 decimillimeters (dmm), and from about 2 to about 25 weight percent of a member selected from the group consisting of styrene-butadiene-styrene, styrene-ethylene-butylene-styrene, styrene-isoprene-styrene copolymers, and mixtures of these. In another embodiment of the invention, the polymer-modified bitumen blend comprises a mixture of about 65 to about 90 weight percent of bitumen, having a softening point between about 75° to about 240° F. (about 23.9° C. to about 115.6° C.) and a penetration at 77° F. (25° C.) between 5 and 350 dmm, from about 10 to about 35 weight percent of a polymer being a member selected from the group consisting of amorphous or atactic polypropylene, ethylene-propylene, and mixtures of these, and from about 0 to about 10 weight percent of isotactic polypropylene.

The flame-retardant compounds are then added to the bitumen or modified bitumen blend. The bitumen and flame-retardant compounds are agitated until the entire mixture is homogenous. It is advantageous to maintain the mixing temperature below the decomposition temperature of the flame-retardant compounds. When mixing temperatures above 400° F. (204° C.) are needed for blending the thermoplastic polymer into the bitumen, magnesium hydroxide is generally preferred as the primary flame-retardant compound. Magnesium hydroxide is preferred at higher mixing temperatures because magnesium hydroxide has a higher decomposition temperature than alumina trihydrate. The thermoplastic polymer is generally added to the bitumen in a concentration of about 1 to about 45 weight percent and, preferably, about 2 to about 25 weight percent. The most preferable concentration of thermoplastic polymer is about 5 to about 10 weight percent based on the total weight of the flame-retardant bitumen composition. The styrene copolymers are, preferably, included in a concentration of about 2 to 25 weight percent based on the total weight of the flame-retardant bitumen composition. The amorphous or atactic polypropylenes, ethylene-propylene copolymers, and combinations thereof are, preferably, included in a concentration of 10 to 25 weight percent. The atactic polypropylenes are included in a concentration of up to about 10 weight percent based on the total weight of the flame-retardant bitumen composition.

The mixture of flame-retardant compounds of the present invention, preferably, contains from about 1 to about 90 weight percent of the mixture of alumina trihydrate and/or from about 1 to about 90 weight percent of the mixture of magnesium hydroxide, from about 1 to about 90 weight percent of the mixture of zinc borate, and 0 to about 90 weight percent of the mixture of calcium carbonate. The mixture of flame-retardant compounds is effective in the range of about 10 to about 40 weight percent based on the total weight of the flame-retardant bitumen composition. In preferred embodiments of the invention, the mixture of flame-retardant compounds is included in the bitumen composition in a concentration of about 10 to about 30 weight percent and, most preferably, about 15 to about 20 weight percent based on the total weight of the flame-retardant bitumen composition. In preferred embodiments, the alumina trihydrate, magnesium hydroxide, zinc borate, and calcium carbonate are commercial grade materials.

The primary ingredient of the mixture of flame-retardant compounds is alumina trihydrate, magnesium hydroxide, or mixtures of these. Alumina trihydrate liberates 34 to 35 percent chemically-bound water of hydration at about 440° F. to about 450° F. (about 226.6° C. to about 232.2° C.). During the decomposition, alumina is formed and water is released. The endothermic dehydration cools the roofing membrane and retards the spread of flames to other areas. Magnesium hydroxide contains about 30 to 31 percent water of hydration and releases water endothermically in a similar manner to that of alumina trihydrate at a temperature of 610° F. to 620° F. (321° C. to 326.6° C.). The mixture of flame-retardant compounds is, preferably, added to the bitumen composition so that the alumina trihydrate or magnesium hydroxide is present in a concentration about 10 to about 20 weight percent and, preferably, about 12 to about 17 weight percent based on the total weight of the flame-retardant bitumen composition.

The second most significant ingredient in the mixture of flame-retardant compounds is zinc borate. Zinc borate is an effective char-forming flame-retardant. Zinc borate acts to slow down the combustion of the bitumen and to isolate the surface of the polymer modified roofing material from flames. Zinc borate also retards flame penetration into the roofing material. Zinc borate is, generally, added in a concentration of about 2 to about 20 weight percent based on the total weight of the flame-retardant bitumen composition. In preferred embodiments of the invention, zinc borate is in a concentration of about 2 to about 10 weight percent and, most preferably, about 4 to about 6 weight percent based on the total weight of the flame-retardant bitumen composition.

Calcium carbonate can, optionally, be used in the mixture of flame-retardant compounds and is provided from crushed limestone in the form of a fine powder or dust. Calcium carbonate is, preferably, added in a concentration of about 2 to about 20 weight percent based on the total weight of the flame-retardant bitumen composition. In desirable embodiments of the invention, calcium carbonate is present in a concentration of about 2 to about 10 weight percent and, preferably, about 4 to about 6 weight percent based on the total weight of the flame-retardant bitumen composition.

The process for manufacturing a roofing material from the invented flame-retardant bitumen composition can be as follows. The blend of bitumen and thermoplastic polymer is prepared by blending the bitumen and the thermoplastic polymer at a temperature range of about 320° F. to about 390° F. (about 160° C. to about 198.8° C.). The blending is, desirably, performed by using either a high shear or paddle mixer. These components are mixed until the polymer is completely dispersed into the bitumen to obtain a homogeneous mixture. The blend of bitumen and thermoplastic polymer is transferred to an agitated holding tank where the temperature is maintained at 320° F. to 365° F. (160° C. to 185° C.) when mixing. The mixture of flame-retardant compounds is, then, added to the blend of bitumen and thermoplastic polymer and mixed thoroughly with the paddle mixer in a holding tank.

The flame-retardant bitumen composition can be used in the production of base sheets, finished roofing membranes, that are known as "cap sheets" and shingle underlayments These products can be reinforced by fiberglass fiber, polyester, or a combination of these fibers.

Roofing membranes are, usually, made with polyester fiber, fiberglass, or polyester-fiberglass reinforcement mats that are saturated and coated on both sides with a bituminous coating. The fiber reinforced mats can be woven or non-woven. Fiber reinforced roofing membranes can be made from a single or multiple ply structure depending upon the desired thickness of the desired roofing material. Generally, a thickness of about 0.07 to about one inch is sufficient to provide desirable weather resistance, although a roofing material thickness between about 0.12 and about 0.2 inch is recommended.

A method for coating a reinforced roofing material can include dipping, spraying, soaking, or mechanically coating the membrane with a doctor blade, coating tank, or similar device. When coating the reinforcement material, the polymer modified bitumen composition is, generally, applied in a thickness of about 1.0 millimeter to about 6.0 millimeter.

The flame-retardant bitumen composition of the present invention is applied to the reinforcement roofing material at a temperature of approximately 325° F. to 425° F. (162.7° C. to 218.3° C.). As the coated reinforcement leaves the coating device, it is surfaced on its top side with roofing granules or other mineral particulates such as sand, talc, mica, or ceramic particles. The back of the roofing material is either surfaced with similar mineral matter or is laminated with a polypropylene film, polyethylene film, kraft paper, or parchment. The resulting fiber reinforced roofing material is very flexible and can be easily handled and unrolled for overlaying an existing roof deck or a new roof platform.

Many methods for applying a roofing material made according to this invention can be used. For example, the present roofing material can be utilized as the sole roof covering over the entire roofing deck. Alternatively, a base or top layer of the roofing material can be used with intermediate layers of different roofing materials, such as an impregnated or non-impregnated glass mat. In further embodiments, alternate layers of the roofing material and other materials can be employed. A specific installation procedure can be performed by any conventional procedure known by those skilled in the art.

Roofing materials according to the invention can be affixed to a roof by a means for mechanically fastening the roofing material, cold mastics, hot asphalt, or thermofusing. The roofing materials can alternatively be self-adhering by formulating the bituminous coating with polymeric additives, and/or extender oils, and/or tackifying resins. The adhesive side of the roofing material must be protected with a peel layer, such as silicone treated film, kraft paper, or parchment which can be easily peeled from the product before the product is self-adhered to the roofing substrate.

COMPARATIVE EXAMPLE A AND EXAMPLE 1

This comparative example and example demonstrate the production of a control composition and a flame-retardant bitumen composition. A styrene-butadiene-styrene block copolymer was mixed with a bitumen using a high shear mixer. Once the components were well dispersed and homogeneity was achieved, the blend was transferred to an agitated holding tank where the temperature was maintained at 375° F. (190.6° C.). Alumina trihydrate, zinc borate, and calcium carbonate, in the form of ground limestone, were added to the polymer-bitumen blend and agitated to form a homogenous mixture. The proportions of the components are listed in Table 1.

TABLE 1

| Component | Comp. Example A Blend A (wt %) | Example 1 Blend B (wt %) |
|---|---|---|
| Bitumen (120–150 penetration) | 61.6 | 61.6 |
| Styrene-butadiene-styrene block copolymer | 8.4 | 8.4 |
| Alumina trihydrate | — | 20 |
| Zinc borate | — | 5 |
| Limestone (calcium carbonate) | 30 | 5 |
| | 100.0% | 100.0% |

Blends A and B were used to produce approximately 4 millimeter (mm) thick fiberglass reinforced roofing membranes surfaced with roofing granules. These membranes were tested at Underwriters Laboratories, Northbrook, Illinois, for flame spread in accordance with the UL 790/ASTM E108 Standard. The test panels were plywood decks of 40 inches by 9 feet by 15/32 inch plywood and had a 4 inch thick isocyanurate insulation layer, a fiberglass base sheet, and the flame-retardant roofing membrane. The test results are summarized in Table 2.

TABLE 2

| Product Tested | Roof Slope inches/linear foot(in/ft) | Burn Length (ft) |
|---|---|---|
| Membrane produced with Blend A | 1 in/ft | more than 6' |
| Membrane produced with Blend B | 1 in/ft | 4 ¾' |

| Product Tested | Burn Width (in) | Classification* |
|---|---|---|
| Membrane produced with Blend A | more than 40" | none |
| Membrane produced with Blend B | less than 40" | UL Class A |

*A Class A rating is achieved if a burn length is less than or equal to 6 feet and a burn width is less than 40 inches.

COMPARATIVE EXAMPLE B AND EXAMPLES 2 THROUGH 6

This comparative example and these examples compare the relative fire retardancy of a control sample, containing calcium carbonate, with various embodiments of the present invention. The embodiments of the present invention maintain a constant total weight percent of the mixture of flame-retardant compounds.

Blends C through H, as identified in Table 3, were prepared in a quart container using a laboratory mixer at a temperature of about 320° F. to about 390° F. (about 160° C. to about 198.8° C.). These components were maintained at a temperature of at 320° F. (160° C.) and mixed for sufficient time to disperse the copolymer in the bitumen and to form a homogeneous mixture. Alumina trihydrate, magnesium hydroxide, zinc borate, and calcium carbonate, in the form of ground limestone, were added to the polymer/bitumen blend and agitated to form a homogeneous mixture. The proportions of the components are listed in Table 3.

TABLE 3

| Components | Comp. Example B Blend C % by wt. | Example 2 Blend D % by wt. | Example 3 Blend E % by wt. |
|---|---|---|---|
| Bitumen (120–150 pen.) | 61.6 | 61.6 | 61.6 |
| SBS copolymer | 8.4 | 8.4 | 8.4 |
| Alumina trihydrate | — | 20 | — |

TABLE 3-continued

| | | | |
|---|---|---|---|
| Magnesium hydroxide | — | — | 25 |
| Zinc Borate | — | 5 | 3 |
| Limestone | 30 | 5 | 2 |

| Components | Example 4 Blend F % by wt. | Example 5 Blend G % by wt. | Example 6 Blend H % by wt. |
|---|---|---|---|
| Bitumen (120–150 pen.) | 61.6 | 66.0 | 54.0 |
| SBS copolymer | 8.4 | 9.0 | 6.0 |
| Alumina trihydrate | 10 | 15 | 15 |
| Magnesium hydroxide | 10 | — | 15 |
| Zinc Borate | 5 | 7 | 5 |
| Limestone | 5 | 3 | 5 |

Blends C through H were used to impregnate and coat 12 inch by 24 inch polyester reinforced membranes in order to form the laboratory samples. These mock roofing membrane samples were attached to a test deck of 10 inches by 18 inches by ½ inch thick plywood, a 4 inch thick isocyanurate insulation layer, and a fiberglass reinforced base sheet. The test samples were mounted to form a slope of 1 inch per linear foot. A laboratory bunsen burner was used as the flame source. The burn tests were performed for 2 minutes and the burn areas were then determined. The burn area of the sample made with Blend C, the control sample, was 107 square centimeters. The burn areas on the samples of Blends D through H were measured at 79 square centimeters, 81 square centimeters, 78 square centimeters, 85 square centimeters, and 66 square centimeters, respectively.

COMPARATIVE EXAMPLE C AND EXAMPLES 7 THROUGH 9

The Blends I through L of this comparative example and these examples are identified in Table 4 and were prepared in a quart container using a laboratory mixer and the same procedure as described for Examples 2 through 6.

TABLE 4

| Components | Comp. Exp. C Blend I % by wt. | Exp. 7 Blend J % by wt. | Exp. 8 Blend K % by wt. | Exp. 9 Blend L % by wt. |
|---|---|---|---|---|
| Bitumen (120–150 pen.) | 60 | 56 | 56 | 56 |
| Atactic Polypropylene | 22 | 21 | 21 | 21 |
| Isotactic Polypropylene | 3 | 3 | 3 | 3 |
| Alumina trihydrate | — | 15 | — | 10 |
| Magnesium hydroxide | — | — | 15 | — |
| Zinc Borate | — | 5 | 5 | 5 |
| Limestone | 15 | — | — | 5 |

Test samples were prepared and tested using the same procedures as described for Examples 2 through 6. The burn area for Blend I, the control sample, was 117 square centimeters. Burn areas determined on the samples made with Blends J, K, and L were 79, 85, and 95 square centimeters, respectively.

I claim:

1. A roofing composition consisting essentially of a single layer of a material coated or impregnated with a halogen-free flame-retardant bitumen composition, said bitumen composition comprising:
   at least about 45 weight percent of bitumen;
   about 2 to about 25 weight percent of a thermoplastic polymer;
   about 5 to about 30 weight percent of a member selected from the group consisting of alumina trihydrate, magnesium hydroxide, and mixtures of these;
   about 2 to about 20 weight percent of zinc borate; and
   about 2 to about 20 weight percent of calcium carbonate, wherein said weight percents are of a total weight of said halogen-free flame-retardant bitumen composition, said roofing composition having sufficient mechanical properties for a UL approved class A rating.

2. The roofing composition of claim 1, wherein said material includes a membrane of a member selected from the group consisting of polyester fibers, fiberglass fibers, and mixtures of these.

3. The roofing composition of claim 1, wherein said thermoplastic polymer is a member selected from the group consisting of styrene-butadiene-styrene block copolymer, styrene-ethylene-butylene-styrene block copolymer, styrene-isoprene-styrene block copolymer, styrene-butadiene diblock copolymer, ethylene-propylene copolymer, atactic polypropylene, and mixtures of these.

4. The roofing composition of claim 3, wherein said thermoplastic polymer is an atactic polypropylene, said atactic polypropylene being in a concentration of about 10 to about 25 weight percent of said halogen-free flame-retardant bitumen composition.

5. The roofing composition of claim e, wherein said thermoplastic polymer is an styrene-butadiene-styrene block copolymer, said styrene-butadiene-styrene block copolymer being in a concentration of about 10 weight percent of said halogen-free flame-retardant bitumen composition.

6. The roofing composition of claim 1, wherein:
   said member being selected from the group consisting of alumina trihydrate, magnesium hydroxide, and mixtures of these is in a concentration of 12 to 20 weight percent;
   said zinc borate is in a concentration of 4 to 6 weight percent; and
   said calcium carbonate is in a concentration of 4 to 6 weight percent wherein said weight percents are of a total weight of said halogen-free flame-retardant bitumen composition.

* * * * *